US012599129B2

(12) United States Patent
Farina et al.

(10) Patent No.: US 12,599,129 B2
(45) Date of Patent: Apr. 14, 2026

(54) FORMULATION AND COMPOSITION WHICH PROMOTE TARGETED POLLINATION BY BEES TOWARDS BLUEBERRY CROPS AND RELATED METHODS

(71) Applicants:CONSEJO NACIONAL DE INVESTIGACIONES CIENTÍFICAS Y TÉCNICAS (CONICET), Ciudad Autónoma de Buenos Aires (AR); UNIVERSIDAD DE BUENOS AIRES, Ciudad Autónoma de Buenos Aires (AR)

(72) Inventors: Walter Marcelo Farina, Ciudad Autónoma de Buenos Aires (AR); María Cecilia Estravis Barcala, Ciudad Autónoma de Buenos Aires (AR); Florencia Palottini, Ciudad Autónoma de Buenos Aires (AR)

(73) Assignees: CONSEJO NACIONAL DE INVESTIGACIONES CIENTÍFICAS Y TÉCNICAS (CONICET), Ciudad Autónoma de Buenos Aires (AR); UNIVERSIDAD DE BUENOS AIRES, Ciudad Autónoma de Buenos Aires (AR)

( * ) Notice: Subject to any disclaimer, the term of this patent is extended or adjusted under 35 U.S.C. 154(b) by 522 days.

(21) Appl. No.: 17/903,909

(22) Filed: Sep. 6, 2022

(65) Prior Publication Data

US 2023/0080793 A1    Mar. 16, 2023

Related U.S. Application Data

(60) Provisional application No. 63/240,486, filed on Sep. 3, 2021.

(51) Int. Cl.
| | |
|---|---|
| *A01N 31/04* | (2006.01) |
| *A01N 27/00* | (2006.01) |
| *A01N 37/02* | (2006.01) |
| *A01P 19/00* | (2006.01) |

(52) U.S. Cl.
CPC ............. *A01N 31/04* (2013.01); *A01N 27/00* (2013.01); *A01N 37/02* (2013.01); *A01P 19/00* (2021.08)

(58) Field of Classification Search
None
See application file for complete search history.

(56) References Cited

FOREIGN PATENT DOCUMENTS

| | | | |
|---|---|---|---|
| CN | 101569286 A | 11/2009 | |
| CN | 102823628 A | 12/2012 | |
| JP | 2008212148 | 9/2008 | |
| JP | 2020132680 A | * 8/2020 | |
| WO | WO2013005200 A1 | 1/2013 | |
| WO | WO-2019021209 A1 | * 1/2019 | ............... A01G 7/00 |
| WO | WO2019021210 A1 | 1/2019 | |
| WO | WO2019073443 A1 | 4/2019 | |

OTHER PUBLICATIONS

Szendrei, Zsofia et al. "Response of Cranberry Weevil (*Coleoptera*: Curculionidae) to Host Plant Volatiles." Environ. Entomol. (2009), 38, 861-869. (Year: 2009).*
Blanke, M. "Structure and Function of Blueberry Fruit and Flowers: Stomata, Transpiration and Photoassimilation." Horticulture, (2024), 10, 606-613. (Year: 2024).*
Akšic, M. F. et al. "Comparison of Sugar Profile between Leaves and Fruits of Blueberry and Strawberry Cultivars Grown in Organic and Integrated Production System." Plants, (2019), 8, 205-221. (Year: 2019).*
McArt, S. H. et al. "Floral Scent Mimicry and Vector-Pathogen Associations in a Pseudoflower-Inducting Plant Pathogen System." PLoS One, (2016), 11, e0165761. (Year: 2016).*
"Cinnamic alcohol", The Fragrance Conservatory, accessed Apr. 18, 2025. (Year: 2025).*
Farina WM, Arenas A, Diaz PC, Susic Martin C, Estravis Barcala MC (2020). *Learning of a mimic odor within honeybee hives improves pollination service efficiency in a commercial crop.* Current Biology, 30, 1-7, 13 pages. https://doi.org/10.1016/j.cub.2020.08.018).

* cited by examiner

*Primary Examiner* — David J Blanchard
*Assistant Examiner* — Kaeleigh E Olsen
(74) *Attorney, Agent, or Firm* — MUNCY, GEISSLER, OLDS & LOWE, P.C.

(57) ABSTRACT

Provided herein are formulations and compositions to favor the selective pollination of blueberry crops throughout a mixture of compounds effective for the olfactory training of bees in such a manner that they get attracted to blueberry flowers. A method for promoting targeted pollination by honeybees towards blueberry crops which uses the formulations and the compositions of the invention is also described.

11 Claims, 9 Drawing Sheets

| Compound | Variety (Location) | | | |
|---|---|---|---|---|
| | Emerald (Gdor. Virasoro) | San Joaquin (Gdor. Virasoro) | Snowchaser (Concordia)* | Emerald (San Pedro) |
| alpha-pinene | M | x | | M |
| camphene | M | x | | x |
| benzaldehyde | x | x | | x |
| sabinene | x | M | | x |
| hexenyl acetate | M | x | | |
| limonene | M | M | x | x |
| carene | | x | | |
| nonanal | | x | | M |
| E or Z cinnamyl aldehyde | x | x | | x |
| E or Z cinnamyl alcohol | M | M | | |
| Hydrocinnamyl acetate | x | x | | |
| cinnamyl acetate | x | | | |
| bourbonene | | x | M | X |
| caryophyllene | | | x | X |

Fig. 2

*A:*
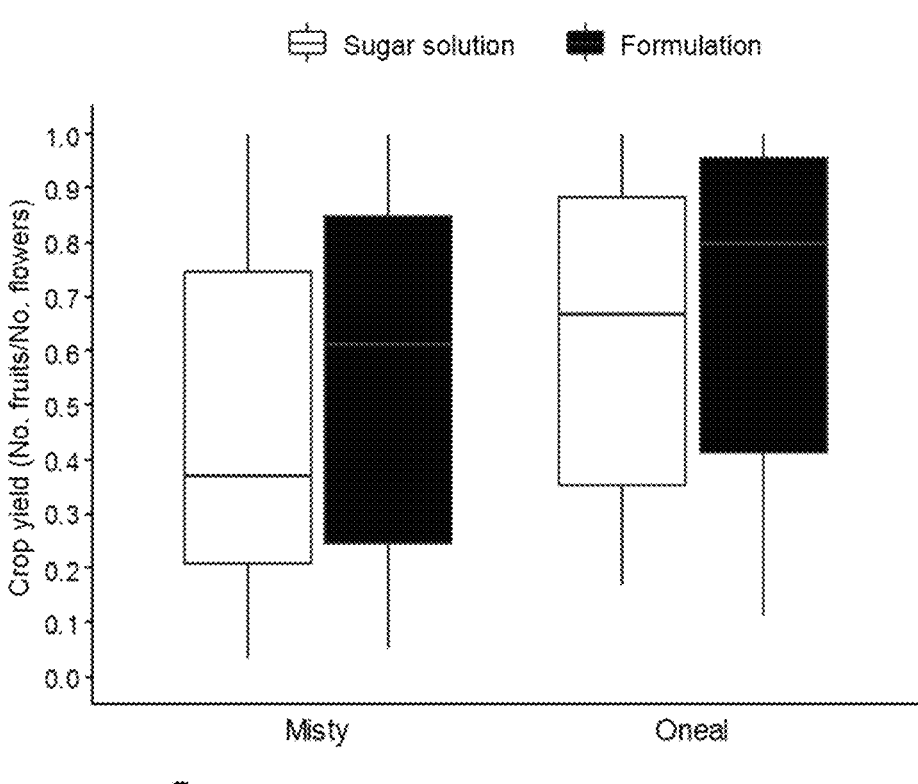
*B:*
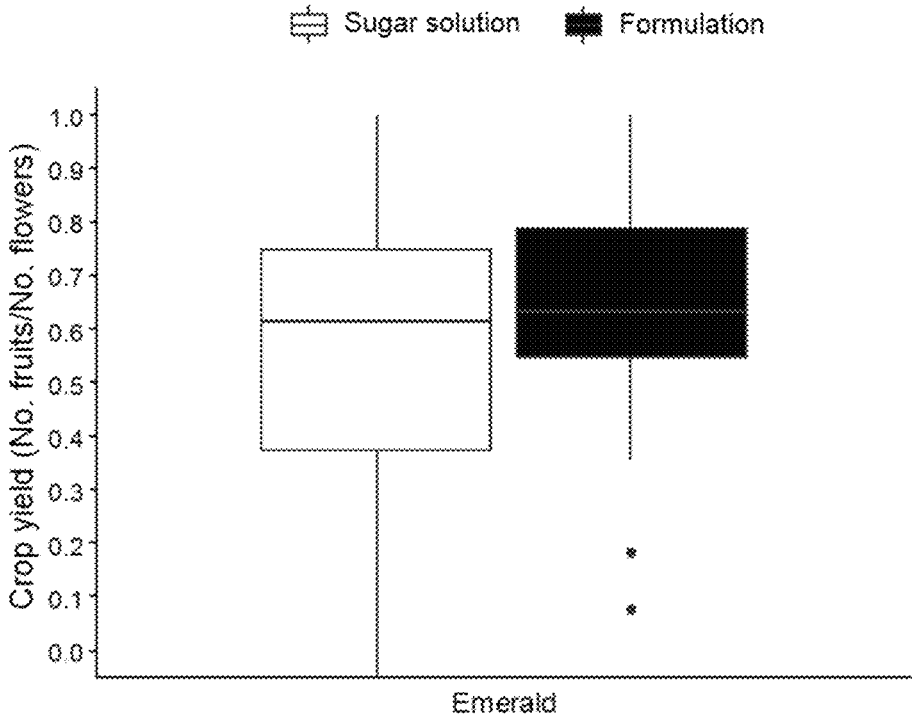
Fig. 7

FORMULATION AND COMPOSITION WHICH PROMOTE TARGETED POLLINATION BY BEES TOWARDS BLUEBERRY CROPS AND RELATED METHODS

CROSS REFERENCE TO RELATED APPLICATIONS

This application claims priority of U.S. Provisional Application No. 63/240,486 filed on Sep. 3, 2021 under 35 U.S.C. § 119(e), the entire contents of all of which are hereby incorporated by reference.

BACKGROUND OF THE INVENTION

Scents play an important role for bees in the selection and discovery of food sources. It is known that bees target the collection of resources not only according to innate search templates, but also according to previously acquired experiences, either in the field or within the beehive social environment (Ribbands C R (1955) *The scent language of honey bees; Ann Rev Smithson Inst* 368-377; von Frisch K (1967) *The dance language and orientation of bees*; Harvard University Press, Cambridge, MA). In this regard, the olfactory memories established in the field from floral scents and their nectar can be retrieved (recalled) upon the presentation of said floral scent in the beehive (Ribbands C R (1954) *Communication between honeybees: the response of crop-attached bees to the scent of their crop; Proc R Entomol Soc Lond A* 29:141-144; Johnson D L y Wenner A M (1966) *A relationship between conditioning and communication in honeybees; Anim Behav* 14:261-265; Jakobsen H B y col., (1995) *Can social bees be influenced to choose a specific feeding station by adding the scent of the station to the hive air? J Chem Ecol* 21(11):1635-1648; Reinhard J y col., (2004) *Floral scents induce recall of navigational and visual memories in honeybees. J Exp Biol* 207:4371-4381). In addition, the ingestion of scented food that forager bees introduce into the nest can produce a bias in the collection preferences of their nest mates (von Frisch K (1923) *Über die Sprache der Bienen; Zool Jb Physiol* 40:1-186; Wenner A M y col, (1969) *Honey bee recruitment to food sources: olfaction or language? Science* 164:84-86; Dornhaus A, Chittka L (1999) *Evolutionary origins of bee dances; Nature* 401:38).

During collection in scented food sources, hive members may learn their odors when these remain impregnated on the body of the forager bee (von Frisch K (1967) *The dance language and orientation of bees*; Harvard University) and/or when small samples of scented food are transferred mouth-to-mouth among nest mates (trophallaxis) (Farina, W M y col. (2007) *Honeybees learn floral odors while receiving nectar from foragers within the hive; Naturwissenschaften*, 94:55-60).

In addition, it has been shown that the scented food introduced by forager bees which circulates inside the hive may affect the behavior of young bees who are still not involved in foraging-related tasks (Grüter C et al, (2006) *Propagation of olfactory information within the honeybee hive. Behav Ecol Sociobiol* 60:707-71; Grüter C et al. (2009). *Retention of long-term memories in different age-groups of honeybee (Apis mellifera) workers. Insectes Sociaux*, DOI 10.1007/s00040-009-0034-0).

Previously, the inventors hereof have published results indicating that bees may develop olfactory memories inside the hive during the circulation of scented food that may be retrieved (recalled) days later outside the nest, which is evidenced by the bias in foraging preferences. The formation of these memories depends neither on recruitment mechanisms, which are common inside the hives, nor on the presence of scented food stores that facilitate the retrieval of previously acquired memories (Arenas A et al. (2007). *Floral odor learning within the hive affects honeybees' foraging decisions. Naturwissenschaften*, 94:218-222).

In *"Floral odor learning within the hive affects honeybees' foraging decisions"*, published in Naturwissenschaften, 94:218-222, Arenas A et al., it is also revealed that the food scent offered "inside the hive" generates long-term olfactory memories that affect election behavior in food sources outside the hive. It is also mentioned that, in order to develop long-term memories of a specific (pure) floral odor, the same must be offered diluted in a sugar solution (50% weight/weight sucrose solution), which can be offered at a feeder located inside the hive (a common procedure in apiculture). The pure odor must be diluted in the sugar solution in minimum quantities (concentration: 50 μl of odor per liter of sugar solution offered).

In *"Floral scents affect the distribution of hive bees around dancers", Behavioral Ecology and Sociobiology* (2007) 61:1589-1597, Jul. 4, 2007, Diaz, Paula C. et al., it is revealed that the floral scent impregnated in the body of a bee returning from a flowering plant attracts their hive mates when following the "bee dance", a mechanism used by this species to recruit other bees towards food sources inside the hive, in addition to increasing the occurrence of transfers of food samples that take place by means of mouth-to-mouth contacts or trophallaxis.

Finally, in *"Floral scents experienced within the colony affect long-term foraging preferences in honeybees"*. Apidologie 39:714-722, 2008, Arenas A et al., it is revealed that it is the food scent circulating inside the hive and not that same scent exposed as volatile that increases the number of landings towards the food source with that specific odor. Likewise, in *"Passive volatile exposure within the honeybee hive and its effect on odor discrimination"*, Journal of Comparative Physiology A, 195:759-768, 2009, Fernández V et al., it is revealed that the floral scent exposed as volatile "within the hive" hinders learning of that floral odor in later trainings. This indicates that odors exposed as volatile compounds inside the nest will not be preferred if they are present in a flowering plant of the environment, even if those floral types offer plenty of nectar as a resource.

There are many crops that require to be pollinated by insects, which favor cross-fertilization when visiting different flowers of the same species. In particular, the *Apis mellifera* bee is the most abundant monoculture pollinator in the world and it is considered of great importance to increase the yield of fruits and seeds.

In some countries ranking the top positions as honey producers worldwide, such as Argentina, apiculture is essentially conceived to obtain the products stockpiled in the beehive (honey, propolis, royal jelly, etc.). However, the use of the honeybee as a crop pollinating agent is sometimes not as fully developed when compared with the importance it is afforded in countries such as the United States or France. Nevertheless, with the rise of monocultures, there is a growing need of increasing the targeted and sustainable pollination of said plantations.

Targeted pollination poses a significant problem regarding the change in floral availability upon moving the beehives from an environment that is familiar to the forager bees to another one which is novel for them. In the novel environment, the bees lack reliable and updated information that can be evoked during collection.

In practice, it is observed that after transhumance (hive relocation) forager bees remain relatively idle during the first days and fail to visit immediately the flowers to be pollinized, even when these offer a high reward. This occurs given that the recently introduced bees have no previous experiences related to the crop of interest, which is why no previously established memories which may guide or help them find this floral type exist. During a variable period of time (which may span up to several days) bees establish new associations (memories) and update the information that will allow them to find the new floral types that are available in the environment.

There are two products available on the market, POLLI-NUS® and BEE SCENT®, which represent the general profile of a trace pheromone of bees, which is why its presence on flowers attracts new bees. Their use implies spraying the product onto the flowers of the crop (any crop), which can be useful in small surfaces (orchards, gardens) but not in large ones. This practice would require several applications of the product, making it too costly and impractical for extensive crops. Given that these products work straightly as attractants of bees (although they could also attract other insects), they are not specific to any flower type in particular and, due to their nature, they could interfere directly with other bee behaviors. None of these products is based on floral odors associated with the appetitive context, nor do they involve the olfactory memory of bees.

Patent application CN102823628 (A) discloses a composition for attracting bees to a soy crop and a method of use thereof, wherein the attractant composition is sprayed onto the soy crop whose pollination is sought to be improved in order to increase production.

One alternative strategy is to "train" the bees so that they prefer to collect pollen from the specific type of flowers whose pollination is sought. This strategy had already been applied in the thirties by beekeepers from the former USSR and Germany, who used this methodology to stimulate the hives with natural fragrances, particularly crushed flowers [(von Frisch, K. (1943), *Versuche über die Lenkung des Bienenfluges durch Duftstoffe. Naturwissenschaften* 31, 445-460]. The disadvantage of this methodology is that the production at an industrial scale of fragrances produced in such a way is inefficient, and it also entails the destruction precisely of flowers of the species whose pollination is sought to be improved. Even more, the fragrances produced by crushed flowers are unstable and do not resist storage properly.

Patent AR082846B1 discloses that it is possible to train honey bees to the sunflower crop by offering scented food within the hive with a synthetic formulation which bees cannot discriminate from the natural fragrance of the sunflower inflorescence (Farina W M, Arenas A, Diaz P C, Susic Martin C, Estravis Barcala M C (2020). Learning of a mimic odor within honeybee hives improves pollination service efficiency in a commercial crop. Current Biology, 30, 1-7. doi.org/10.1016/j.cub.2020.08.018). The composition comprises the compounds sabinene, beta-pinene and limonene. As it is specific for sunflower crops, said composition is not useful for promoting the pollination of blueberry crops.

Patent application CN101569286 (A) discloses compositions and methods for inducing bees to pollinate sterile plant parental lines. The composition comprises secondary metabolites of flowers, such as common alkaloids (e.g., nicotine and caffeine) and water-soluble phenols (e.g., flavonoids, quercetin, gallic acid and caffeic acid). The method consists in introducing the hives inside tents where the plants whose seed is sought to be produced grow, feeding the composition comprising the secondary metabolites to the bees in a specific schedule and continuing such feeding until the end of bloom, later removing the bees from the tent. This method and composition are not directed to any plant species in particular.

In patent application JP2008212148 "Method for promoting pollination of plant including induction of flower bee to floral organ of specific plant by taking advantage of floral fragrance component of flower organ of this plant", a composition of floral fragrances for promoting plant pollination by bees is described. However, in said patent application no composition that mimics in a specific way the fragrance of the blueberry flower and which is useful to target bees' pollination activity towards blueberry crops is described. A composition of this kind cannot be deduced either from that which is disclosed in patent application JP2008212148.

Patent application WO2019073443A1 discloses a composition to attract pollinator insects comprising compounds present in honey, particularly isophorone and 4-oxoisophorone. The composition is especially useful to attract bumblebees. Although the application mentions the possibility of using the composition in blueberry crops, such composition is neither specific to those crops, nor does it comprise compounds present in blueberry flowers.

In patent application WO2013005200 (A1) a composition that promotes the pollination of apple crops (*Malus silvestris*) by biasing the honeybees' foraging preferences is disclosed, as well as a method of use thereof. The composition comprises the compounds citral, benzaldehyde and limonene. As it is specific to apple crops, said composition is not useful to promote the pollination of blueberry crops.

In patent application WO2019021209 (A1) a composition that promotes the pollination of almond tree crops (*Prunus dulcis*) by biasing the honeybees' foraging preferences is disclosed, as well as a method of use thereof. The composition comprises the compounds limonene, linalool and benzaldehyde. As it is specific to almond crops, said composition is not useful to promote the pollination of blueberry crops.

In patent application WO2019021210 (A1), a composition that promotes the pollination of pear crops (*Pyrus*) by biasing the honeybees' foraging preferences is disclosed. The composition comprises the compounds limonene, linalool, and alpha-pinene. As it is specific to pear crops, said composition is not useful to promote the pollination of blueberry crops.

Therefore, there is a need for compositions for promoting the pollination of blueberry crops which are effective and stable, whose production at an industrial scale is simple and economical, as well as for methods that promote the pollination of blueberry crops by bees.

BRIEF DESCRIPTION OF THE INVENTION

It is therefore an object of this invention to provide compositions that simulate the floral scent of blueberries in order to generate specific olfactory memories in bees from hives that will be moved to blueberry crops and used to favor their pollination. Memories established through stimulation with the formulation allow to increase the bees' collecting activity. The composition of the invention stimulates pollination, thereby achieving a significant increase in blueberry crop yields. By using the invention, both the permanence time of hives in the crop and the number of hives used can be reduced. Additionally, the use of the composition improves the nutritional state and increases the population of beehives. On the other hand, the cost of the composition of the invention is very low and does not require any sophisticated technique for its administration.

According to a first aspect, the present invention provides a formulation that promotes targeted pollination by honeybees towards blueberry crops, which comprises the compounds cinnamyl alcohol, cis-3-hexenyl acetate and limonene.

According to another aspect, the present invention provides a composition that promotes the targeted pollination by honeybees towards blueberry crops, which comprises the formulation of the invention diluted in a sugar solution.

According to yet another aspect, the present invention provides a method for promoting targeted pollination by honeybees towards blueberry crops, which comprises the following steps:

a) administering the composition of the invention to the beehives;

b) keeping the beehives within or in the immediate vicinity of the blueberry crop whose pollination is sought to be promoted until the end of the flowering; and c) removing the beehives.

DESCRIPTION OF THE FIGURES

FIG. 1A: Chromatographic profile of volatile compounds present in blueberry flowers of the Emerald variety. 1: alpha-pinene. 2: camphene. 3: benzaldehyde. 4: sabinene. 5: hexenyl acetate. 6: limonene. 7: E- or Z-cinnamaldehyde. 8: E- or Z-cinnamyl alcohol. 9: E- or Z-cinnamaldehyde. 10: E- or Z-cinnamyl alcohol. 11: cinnamyl acetate. * contaminants, ♦: compound of foliar structure.

FIG. 1B. Chromatographic profile of volatile compounds present in blueberry flowers of the San Joaquin variety. 1: alpha-pinene. 2: camphene. 3: benzaldehyde. 4: sabinene. 5: hexenyl acetate. 6: limonene. 7: carene. 8: nonanal. 9: E- or Z-cinnamyl alcohol. 10: E- or Z-cinnamaldehyde. 11: E- or Z-cinnamyl alcohol. 12: hydrocinnamyl acetate. 13: bourbonene. * contaminants, ♦: compound of foliar structure.

FIG. 2. Volatile compounds present in the different blueberry varieties, for the different sampled locations. x means presence of the compound, M means a major compound, * means that the method of collection of volatile compounds was applied by SPME fiber.

FIG. 7. Crop yield. Yields were measured in environments near beehives subjected to two treatments: (i) Control Group: beehives fed with 500 ml of Sucrose Solution in a single dose (white color); (ii) Treated Group: beehives fed with 500 ml of Sucrose Solution with the addition of Mixture VIII (black color). The ratio of the number of fruits to the number of flowers as a function of the different blueberry varieties is shown. (A) shows data taken from a blueberry crop with the Misty and O'Neal varieties (Parada Robles, Province of Buenos Aires). (B) shows data taken from a blueberry crop of the Emerald variety (Concordia, Province of Entre Rios). Data were collected during the 2019 season.

DETAILED DESCRIPTION OF THE INVENTION

Figure 1A:
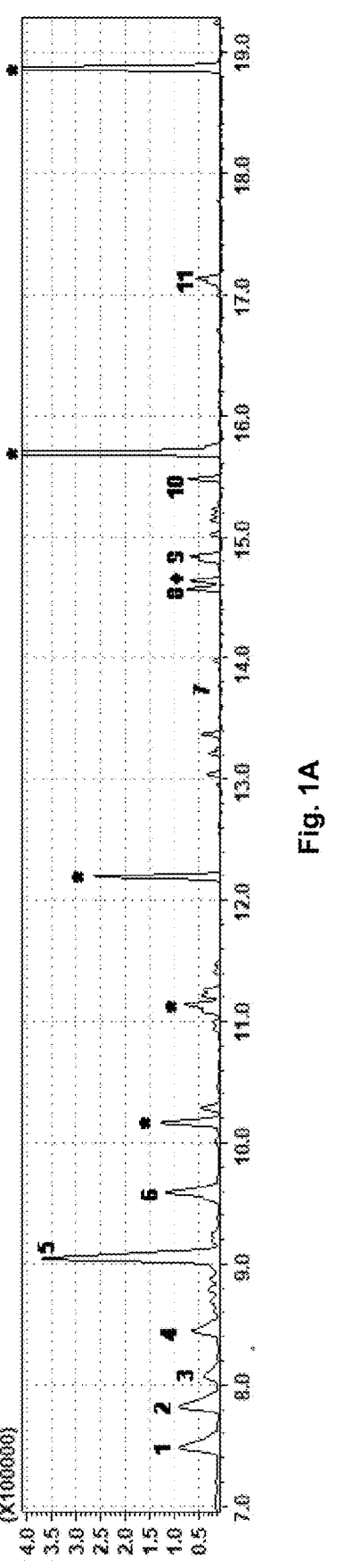
FIGS. 1A and 1B. Chromatographic profile of volatile compounds present in the blueberry flower, identified through GC-MS.
Figure 1B:
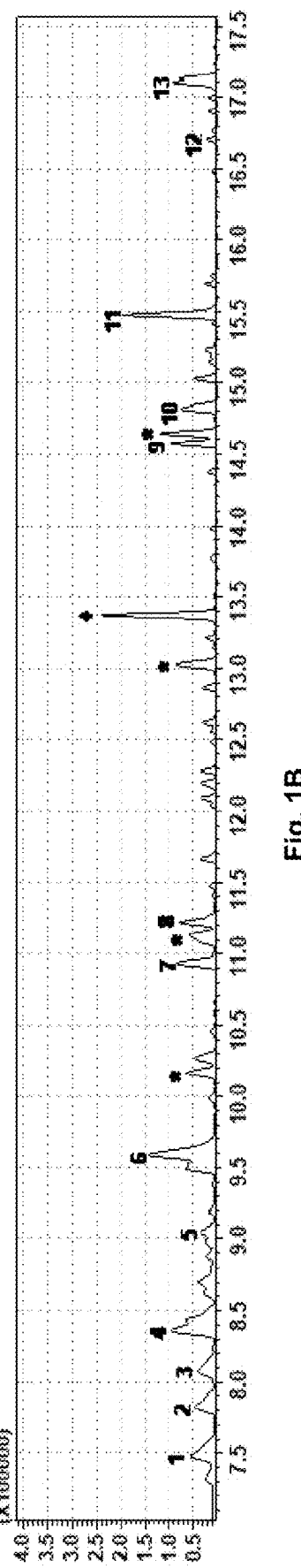

In recent years, pollination with honeybee hives in blueberry crops has gained substantial ground due to the higher yield obtained in the harvest of fruits.

The presence of honeybee hives near blueberry plants since the onset of flowering favors the increase in the number of fertilized flowers and, consequently, an increase in the number of fruit-sets, which results in a larger number of fruits obtained. However, it is widely known that honeybees are less effective pollinators for this crop (Javorek, S. K., Mackenzie, K. E, & Vander Kloet, S. P. Comparative pollination effectiveness among bees (Hymenoptera: Apoidea) on lowbush blueberry (Ericaceae: *Vaccinium angustifolium*). Ann. Entomol. Soc. Am. 95(3), 345-351. (2002); Rogers, S. R, Tarpy, D. R, & Burrack, H. J. Multiple criteria for evaluating pollinator performance in highbush blueberry (Ericales: Ericaceae) agroecosystems. Environ. Entomol. 42(6), 1201-1209. (2013).

For these reasons not only do blueberry producers hire pollination services from beekeepers in the hive tran- shumance business, by renting from them a certain number of beehives for the length of the flowering period, but also an elevated number of honeybee colonies (over 12 per hectare) is added to improve pollination efficiency (Isaacs, R, & Kirk, A. K. Pollination services provided to small and large highbush blueberry fields by wild and managed bees. J. Appl. Ecol. 47(4), 841-849. (2010); Javorek et al. (2002)).

In this context and given that beekeepers normally stimu- late their hives with sugar solutions, the application of a composition containing the synthetic blueberry formulation of the invention represents no meaningful change in bee- keeping practices, yet it proves to be a novel tool that improves pollination efficiency. When beekeepers perform transhumance with their hives during that period, bees from those colonies experience delays in starting to visit novel flowers. Therefore, establishing "memories of a synthetic formulation that mimics the fragrance of blueberry" within the hives would help reduce the delays in starting the collection of this crop and make pollination more efficient.

Therefore, it is a goal of this invention to provide a formulation that mimics the natural scent of blueberry flowers in order to prompt bees to start the immediate collection in blueberry crops. Such formulation comprises the compounds cinnamyl alcohol, cis-3-hexenyl acetate and limonene. Specifically, this formulation increases the bees' collection activity, by attracting them in a specific manner to blueberry flowers, promoting pollination and, consequently, increasing crop yields.

Unless specified otherwise, the percentages of the com- ponents of the formulations of the present invention corre- spond to volume/volume percentages (% v/v).

Although the percentage composition of the compounds cinnamyl alcohol, cis-3-hexenyl acetate and limonene in the formulation of the invention may vary, provided that all three compounds are present, it is preferred that limonene be the most abundant compound, followed by cinnamyl alcohol and cis-3-hexenyl acetate in equal parts. The inventors herein have also determined the optimum ratios for the components of the formulation of the invention. However, a person skilled in the art will notice that those values may vary within a certain range, preferably about +/−10% its relative percentage, without losing efficiency. Preferably, limonene is present between about 45% and 55%. Prefer- ably, cinnamyl alcohol and cis-3-hexenyl acetate are present between 25% and 35%. In the preferred embodiment of the invention, the formulation that mimics the floral scent of blueberry comprises 40% limonene, 30% cinnamyl alcohol, and 30% cis-3-hexenyl acetate. In addition, according to the present application, the term "cinnamyl alcohol" comprises both the compound itself and its derivatives, polymorphs, hydrates, solvates, etc.

Surprisingly, inventors herein have found that, although the formulation of the invention combines only three of the several main volatile compounds identified in the blueberry floral extracts (see Example 1), bees cannot differentiate between (confuse) the scent of the blueberry natural floral fragrance and that of the formulation of the invention. This is particularly unexpected considering that different blue- berry varieties exhibit different profiles of volatile com- pounds, but that the formulation of the invention is never- theless useful to increase the yield of crops of several blueberry varieties (see Example 4 and FIG. 7).

Even more surprisingly, the formulation of the invention performs better than other combinations of volatile com- pounds present in blueberry flowers which would have a priori been expected to show equal or better performance. In fact, as shown in Example 2, the formulation of the inven- tion performs better than similar formulations comprising either alpha-pinene (present as major volatile component in flowers of the Emerald variety) instead of limonene, or alpha-pinene as well as limonene in their formulation.

In addition, field trials also show that beehives which were fed a composition comprising the formulation of the invention, which is also an object of the present application, show greater collection activity in blueberry crops than control beehives, as well as better nutrition and population condition. On the other hand, blueberry crops pollinated by said beehives experience a significant increase in their yield.

According to the method of the invention, the formulation of the invention can be added to the beehive before or during hives' placement in the blueberry crops by using method- ologies of common use and known to beekeepers. The formulation of the invention can be introduced to the bee- hive as part of a composition, which is also an object of the present invention, in which the formulation is diluted at a concentration in the range of 0.1 to 0.2 ml of formulation per liter of a 50% w/w solution of sugar in water. Even more preferably, the composition of the invention comprises 0.1- 0.2 ml of a formulation comprising 40% limonene, 30% cinnamyl alcohol, and 30% cis-3-hexenyl acetate, diluted in a 50% w/w sucrose solution. The composition of the inven- tion promotes the targeted pollination by honeybees towards blueberry crops.

Regarding the form of administration to the beehive, the formulation (as part of, namely, a composition as the one described above) can be placed into an artificial feeder inside the beehive. Alternatively, between 500 and 1000 ml of the sugar composition can be poured directly over the frames of the beehive with bees. Eventually, a second application may be carried out based on the condition of the beehives and the crop. Particularly, when flowering periods are very prolonged, a second application may optionally be carried out to obtain greater benefits.

Correspondingly, it is another aspect of this invention to provide a method for promoting targeted pollination by honeybees towards blueberry crops, wherein said method comprises the steps of:

a) administering the composition of the invention to the beehives;

b) keeping the beehives within or in the immediate vicinity of the blueberry crop whose pollination is sought to be promoted until the end of the flowering period; and c) removing the beehives.

According to a particular embodiment of the method of the invention, step a) is carried out by placing an artificial feeder into the beehive.

According to a particular embodiment of the method of the invention, step a) is carried out by pouring between 500 and 1000 ml of the sugar composition directly over the frames of the beehive with bees.

According to another particular embodiment of the method of the invention, step a) is carried out within 2 days prior to placing the beehives into the crop whose pollination is sought to be promoted.

According to another additional particular embodiment of the method of the invention, step a) is carried out after placing the beehives into the crop whose pollination is sought to be promoted.

According to yet another additional particular embodiment of the method of the invention, step a) is carried out before the flowering level of the crop has reached 20%.

According to yet another additional particular embodiment of the method of the invention, during step b) a second administration of the composition to the beehives is carried out.

The addition of the formulation of the invention, in association with a sugar syrup, before or during installation of the beehives in the blueberry crops, promotes a quick and sustained collecting activity on the crop, as well as a greater general collecting activity. This simple stimulation method facilitates pollination of blueberry crops and demands a fewer number of beehives to be used. Additionally, the formulation of the invention has low production and marketing cost.

Unlike the commercial products POLLINUS® and BEE SCENT®, which produce innate responses in the bee's behavior, the formulation of the invention does not induce "rigid" responses in the bee's behavior (which could be counter-productive in cases in which the same beehives are moved from a given crop to a different one). On the contrary, it influences the decision-making processes, which are flexible and adjustable to the needs of each hive or to changing conditions of the environment. This is essential when pursuing an integrated management of beekeeping and agriculture where generating benefits for one of the activities is not detrimental to the other.

Thus, the formulation of the invention can be used in small quantities in order to stimulate the beehive. In addition, it is a simple formulation comprising only three out of the many volatile compounds of the blueberry flower fragrance, making it an inexpensive product, easy to produce and employ. In addition, the formulation stimulates immediate collection in blueberry crops. Stimulation via administration of the formulation or the composition of the invention can be carried out before moving the bees to the crop and even before the onset of the flowering period of said plant species.

EXAMPLES

Example 1: Identification and Quantification of Volatile Compounds of Blueberry Flowers In order to identify and quantify the volatile compounds present in the blueberry flowers, the following protocol was carried out:

In the blueberry crop, during the flowering period, a branch containing fresh, recently opened flowers was selected. Along with an odor trap, this branch was isolated using a polyethylene bag (the usual oven cooking bag) preventing from harming the plant tissue. The odor trap is a small device consisting of a glass column (Pasteur pipette) containing 100 mg of a particular adsorbent polymer inside (HayeSep Q 80-100 mesh). To this glass column a small hose is connected, which is in turn connected to an air sampling pump with a flow rate of 1 liter/hour. After 8 hours of collection, the glass column was removed and eluted (washed) with 1 or 2 ml of hexane (depending on the sampling performed) in a small glass vial and stored in a freezer for subsequent analysis in a GC-MS (gas chromatography-mass spectrometer, Shimadzu QP-2010). This procedure was carried out considering the different varieties (San Joaquin and Emerald) present in the crops in Gdor. Virasoro (Corrientes province) and San Pedro (Buenos Aires province).

For the Snowchaser variety, which is present in the crops in Concordia (Entre Rios province), a different methodology was used (SPME fiber, solid-phase microextraction). In this case, the fiber is exposed inside the polyethylene bag along with the isolated branch with flowers for 7 hours, so that the adsorbent polymer conforming said fiber can capture the floral volatiles.

In the laboratory, 1 microliter of each sample or the SPME fiber were injected into the GC-MS. Conditions of the chromatograph were as follows: injector method: Splitless, with helium as carrier gas; an injection temperature of 250° C. and an interface temperature of 310° C. The temperature ramp used was: 40 (1)-5-200-15-300 (1); and the column: AT-5 (diameter=0.25 mm, length=30 m, film=0.25 mm, flow=1 ml/min).

For identification of the volatile compounds present in the samples, libraries NIST05, NIST08 and SHIM2205 were used.

Table 1 shows the retention time for the main compounds identified in the different blueberry varieties analyzed.

TABLE 1

| Retention times of the main identified compounds. | | |
|---|---|---|
| Retention time (min) | Identified compound | Variety or varieties in which the compound is present |
| 7.46 | Alpha-pinene | Emerald (SP/GV) |
| 8.05 | Camphene | Emerald (GV) |
| 8.35 | Sabinene | San Joaquin |
| 9.03 | Cis-3-hexenyl acetate | Emerald (GV) |
| 9.55 | Limonene | Emerald (GV)/San Joaquin |
| 10.64 | Nonanal | Emerald (SP) |
| 14.56 | Cinnamyl alcohol | Emerald (GV)/San Joaquin |
| 17.09 | Bourbonene | Snowchaser |

FIG. 2 provides greater detail in relation to the major and minor compounds identified for each evaluated variety.

Example 2: Preparation of Formulations 8 different mixtures were prepared, in each of which 3 or 4 of the volatile compounds identified in Example 1 were combined, or related compounds as cis-3-hexen-1-ol. The composition of each one of the mixtures was:

Mixture I: 60% cinnamyl alcohol, 10% limonene, 30% alpha-pinene.

Mixture II: 60% cinnamyl alcohol, 10% cis-3-Hexen-1-ol, 30% alpha-pinene.

Mixture III: 50% cinnamyl alcohol, 10% cis-3-Hexen-1-ol, 40% alpha-pinene.

Mixture IV: 45% cinnamyl alcohol, 35% cis-3-hexenyl acetate, 20% alpha-pinene.

Mixture V: 45% cinnamyl alcohol, 35% cis-3-hexenyl acetate, 20% limonene.

Mixture VI: 35% cinnamyl alcohol, 25% cis-3-hexenyl acetate, 20% alpha-pinene, 20% limonene.

Mixture VII: 25% cinnamyl alcohol, 25% cis-3-hexenyl acetate, 25% alpha-pinene, 25% limonene.

Mixture VIII: 30% cinnamyl alcohol, 30% cis-3-hexenyl acetate, 40% limonene.

In all cases, pure Sigma-Aldrich® compounds with a purity over 95% were used. Solutions were prepared at room temperature, combining the compounds, without the use of solvents. Once the solutions were prepared, mixtures were immediately used in the experiment and stored at 2-8° C. until the end of the assays (4 days).

Example 3: Evaluation of Mixtures Via Absolute Olfactory Conditioning

Absolute olfactory conditioning was carried out using the proboscis extension response protocol (PER protocol). For this purpose, bees were collected at the beehives entrance, anesthetized and subsequently harnessed in such a manner that their mouthparts and antennae could move freely. During conditioning, bees are trained to associate a determined olfactory stimulus (conditioned stimulus: in this case, some of the stated mixtures) with a reward (unconditioned stimulus: in this case, a sugar solution). Once training was finalized, bees were presented with the natural scent of blueberry flowers and it was recorded whether or not they extended the proboscis, which would mean they mistook or not, respectively, the scent for the taught mixture.

Figure 3:
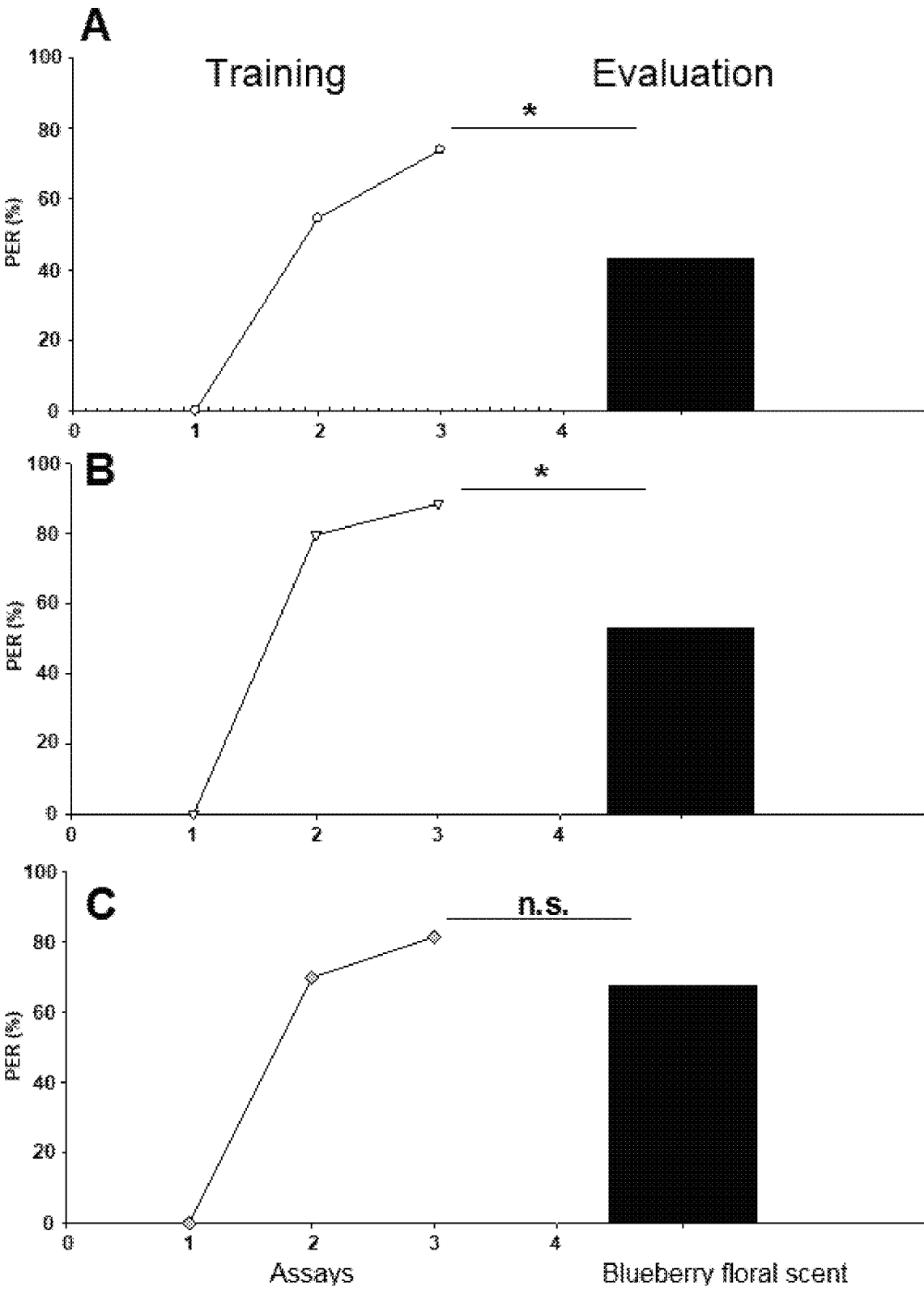
FIG. 3. Results of Olfactory Conditioning experiments. The left panel shows the percentage of bees that extended their proboscises (PER %) during training via Absolute Olfactory Conditioning, a procedure under which harnessed bees must learn to associate an odor with a reward. (A) and (B) show some of the tested mixtures as an example. The odor in (C) is Mixture VIII. The right panel shows evaluation after training, where the response to the blueberry flower was assessed. The asterisk means that significant differences exist (p<0.05) between the last training assay and the response to the blueberry flower. n.s. means that the bees could not distinguish between Mixture VIII and the floral scent of blueberry.

At the end of the conditioning period, bees could differentiate the natural scent of blueberry flowers for the Emerald and O'Neal varieties, except when Mixture VIII was used (FIG. 3 and Table 2).

TABLE 2

Detail of the different mixtures tested in classical olfactory conditioning. Bees cannot discriminate between Mixture VIII and the natural scent of blueberry flowers.

| Mixture | Components | Response to mixture (%) | Response to flower scent (%) | Significance (n) |
|---------|-----------|------------------------|------------------------------|------------------|
| I | Cinnamyl alcohol (60%) Limonene (10%) Alpha-pinene (30%) | 74.0 | 42.9 | *** (77) |
| II | Cinnamyl alcohol (60%) Cis-3-Hexen-1-ol (10%) Alpha-pinene (30%) | 65.0 | 32.5 | *** (40) |
| III | Cinnamyl alcohol (50%) Cis-3-Hexen-1-ol (10%) Alpha-pinene (40%) | 75.0 | 33.3 | * (12) |
| IV | Cinnamyl alcohol (45%) Cis-3-hexenyl acetate (35%) Alpha-pinene (20%) | 100.0 | 30.4 | *** (23) |
| V | Cinnamyl alcohol (45%) Cis-3-hexenyl acetate (35%) Limonene (20%) | 100.0 | 13.6 | *** (22) |
| VI | Cinnamyl alcohol (35%) Cis-3-hexenyl acetate (25%) Limonene (20%) Alpha-pinene (20%) | 97.1 | 52.9 | *** (34) |
| VII | Cinnamyl alcohol (25%) Cis-3-hexenyl acetate (25%) Limonene (25%) Alpha-pinene (25%) | 94.7 | 10.5 | *** (19) |
| VIII | Cinnamyl alcohol (30%) Cis-3-hexenyl acetate (30%) Limonene (40%) | 81.4 | 67.4 | n.s. (43) |

Significance level for t-test for dependent samples is shown, where
*** means $p < 0.001$;
* means $p < 0.05$ and n.s. means $p > 0.05$. n represents sample size.

Example 4: Beehive Stimulation

A total of 104 Langstroth type honeybee hives were set in three groups of 27 to 42 beehives each, surrounding three flowering crop plots with an estimated total area of 5 ha.

Before stimulation, all hives were inspected in order to use only those with similar population levels. 80 hives distributed in the three groups were selected out of the total number of hives for the assignment of the following treatments:

Mixture VIII: beehives fed with sugar solution with mixture VIII (n=20 beehives)

Control group: beehives fed with the sucrose solution (n=20 beehives).

Each beehive was stimulated only once with 500 ml of solution.

Once the beehives were stimulated, the number of bees entering the beehive per minute was recorded at the beehive entrance. This measurement was repeated every day in the morning and in the afternoon, during three days following stimulation, on the total of 20 beehives per treatment. In each measurement, a distinction was made between those bees carrying a corbicular pollen load in their hind legs (entries with pollen) and, at the same time, those bees whose pollen load was of blueberry (mustard color).

Additionally, in order to evaluate the development of the stimulated beehives, the uncapped brood area (not sealed) and the pollen area were measured in two moments: the day before the application of treatments and 11 days later (n=8 beehives/treatment). Thus, for each beehive, a total uncapped brood area and a total pollen area, both initial and final, were obtained to then calculate the difference and thus obtain their development.

Lastly, in order to evaluate the effect of hive stimulation in the crop yield, the flowers present in 3 randomly selected branches in 10 plants/treatment in environments in proximity to the stimulated beehives were marked and quantified. Later, during harvest, the number of fruits in the marked branches was counted to then calculate the ratio of the number of fruits to the number of flowers.

Figure 4:
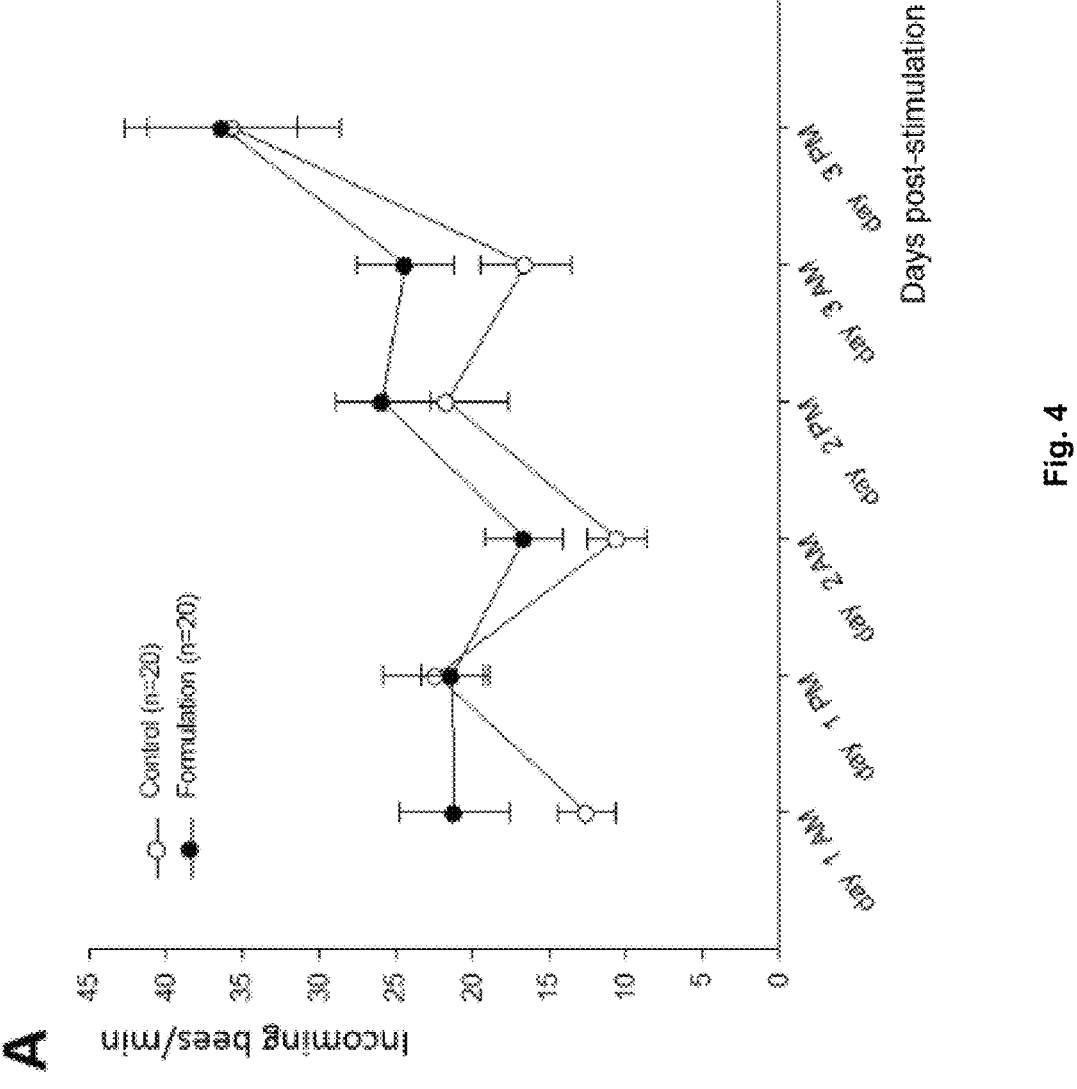
FIG. 4. Beehives activity in the blueberry crop (*Vaccinium corymbosum*). The number of entering bees per minute (mean±SD) was measured in two sets of beehives under the following treatments: (i) Control Group: beehives previously fed by beekeepers with Sucrose Solution (white color); (ii) Formulation Group: the beehives receive 500 ml of Sucrose Solution containing Mixture VIII in a single dose (black color). (A) shows the total number of entries/minute, (B) shows the number of entries with pollen, and (C) shows the number of entries with blueberry pollen as a function of post-stimulation time. The number of hives is stated between brackets. The data were collected from crops located near San Pedro (Province of Buenos Aires) in 2018.
Figure 4:
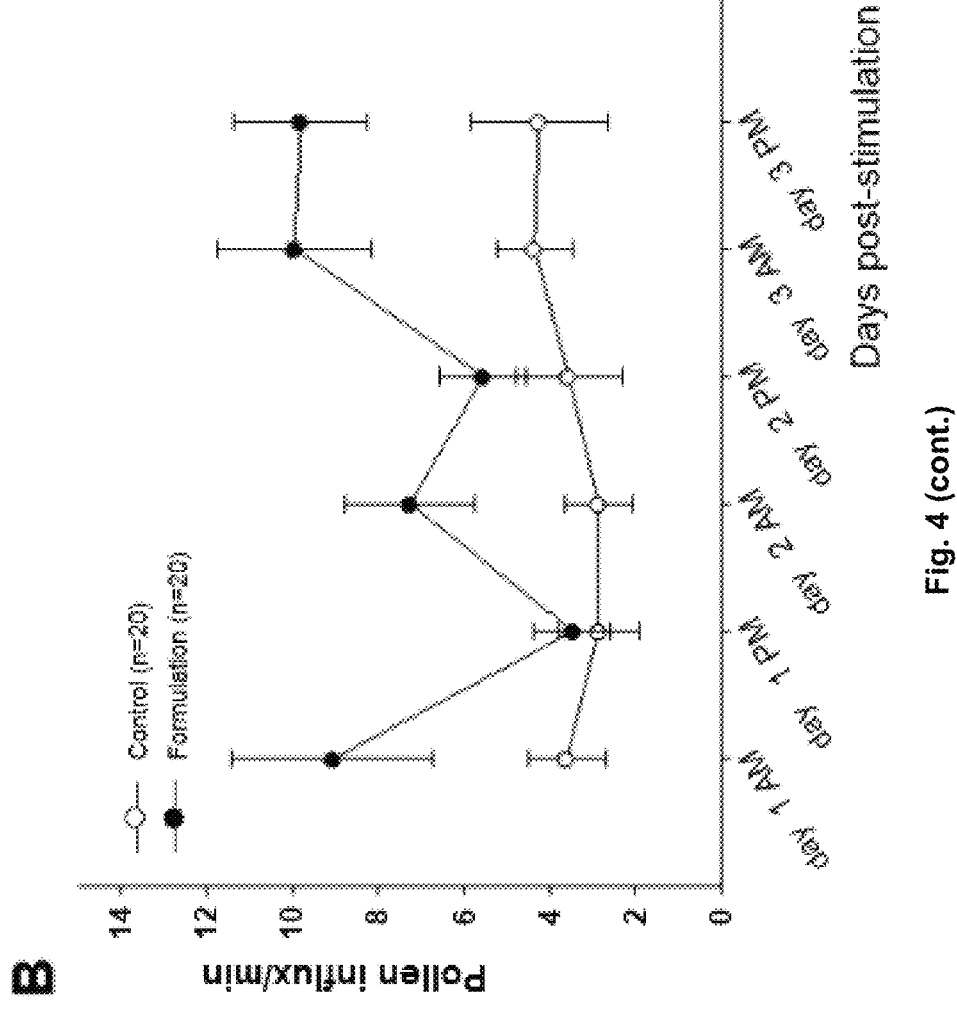
Figure 4:
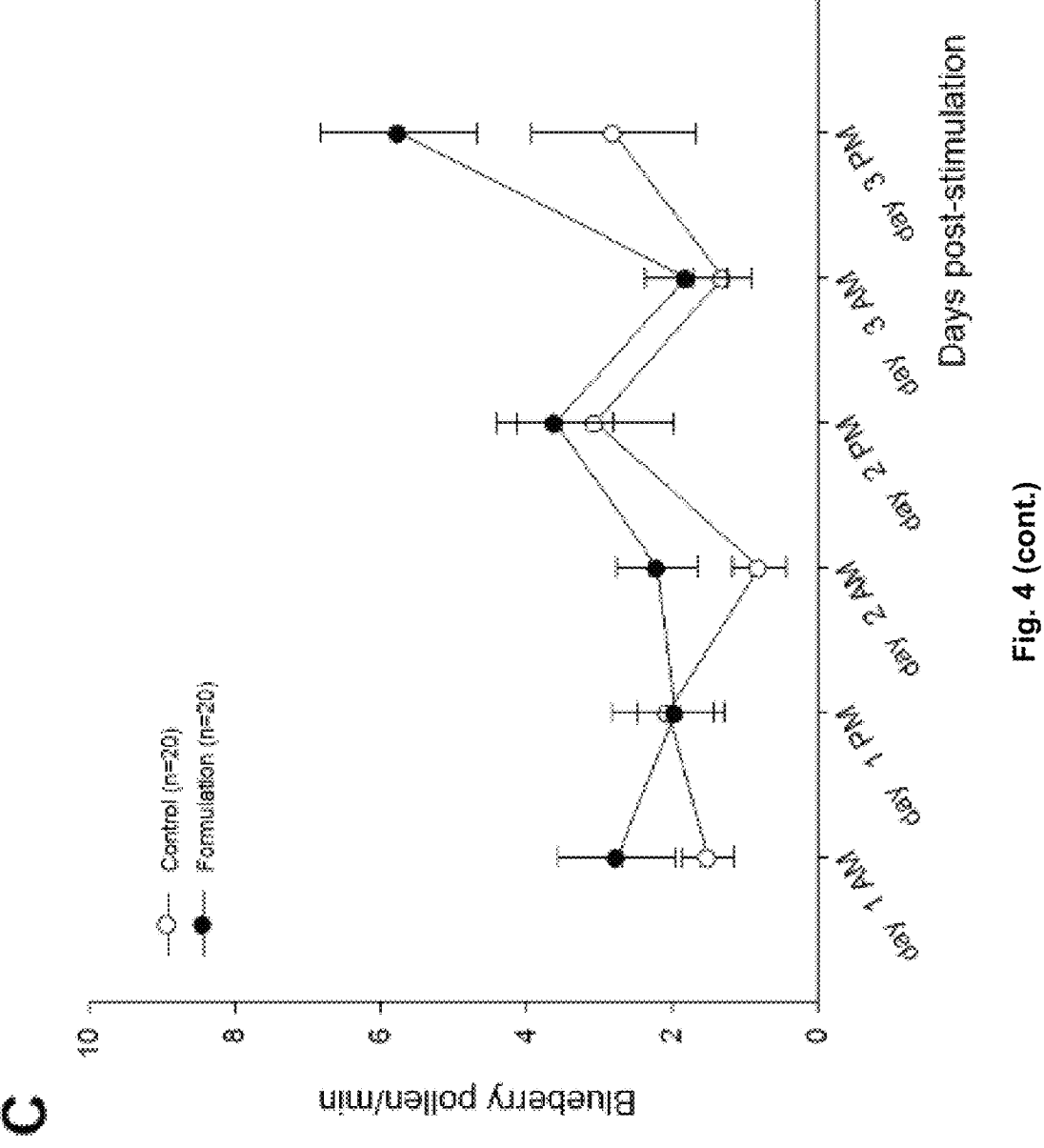

Beehives fed with the composition containing mixture VIII exhibited a level of activity (measured as the number of bees entering the hive per minute, entries with pollen per minute and entries with blueberry pollen per minute), significantly greater than those in the control group (FIG. 4).

Figure 5:
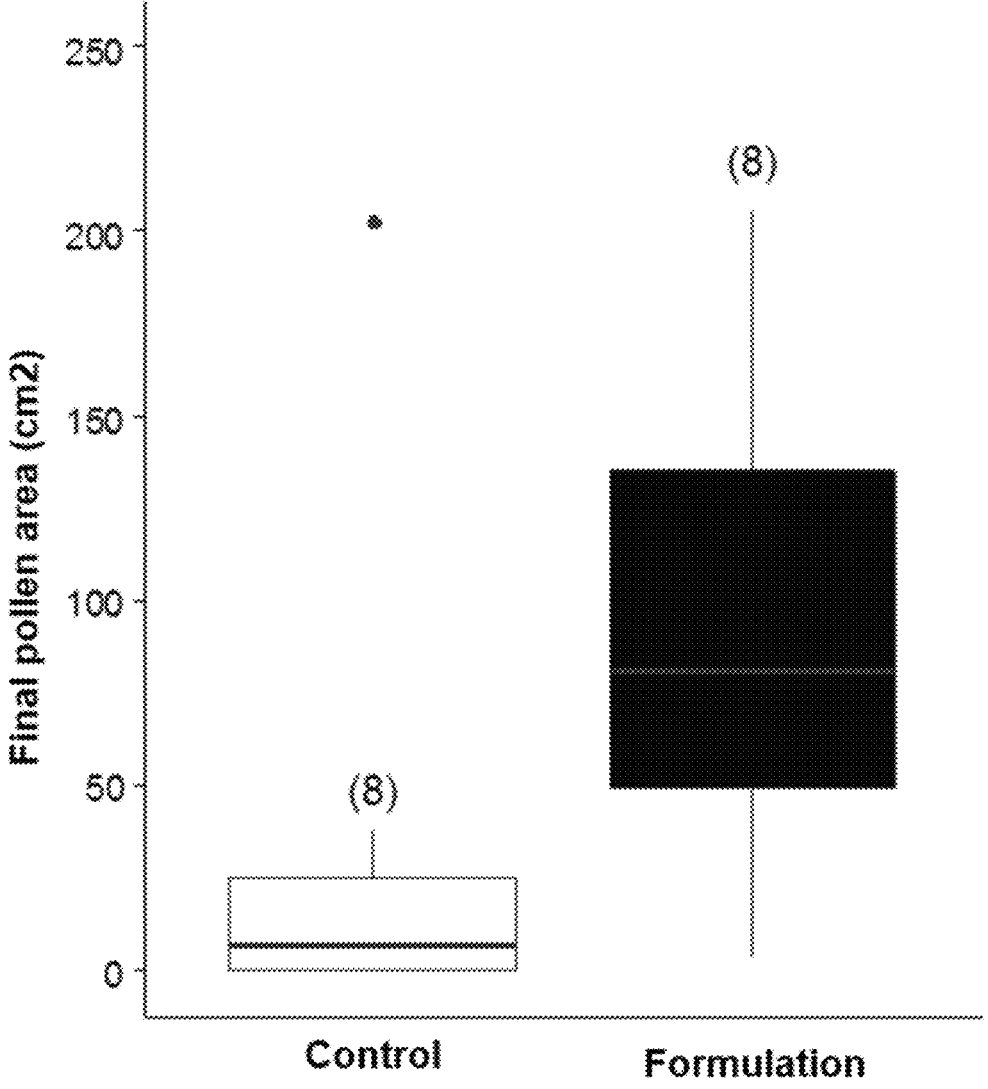
FIG. 5. Food collection in the beehives. The amount of pollen stored was measured during the experimental period in two sets of beehives: (i) Control Group: beehives previously fed by beekeepers with Sucrose Solution (white color); (ii) Treated Group (Formulation): beehives fed with 500 ml of Sucrose Solution with the addition of Mixture VIII (black color). The increase in the area of total pollen inside the hives is shown, measured both prior to administering the treatments and 11 days later. The number of hives is stated between brackets. The data were collected from crops located near San Pedro (Province of Buenos Aires) in 2018. A trend which shows the effect of the application of Mixture VIII (p=0.08) is observed.
Figure 6:
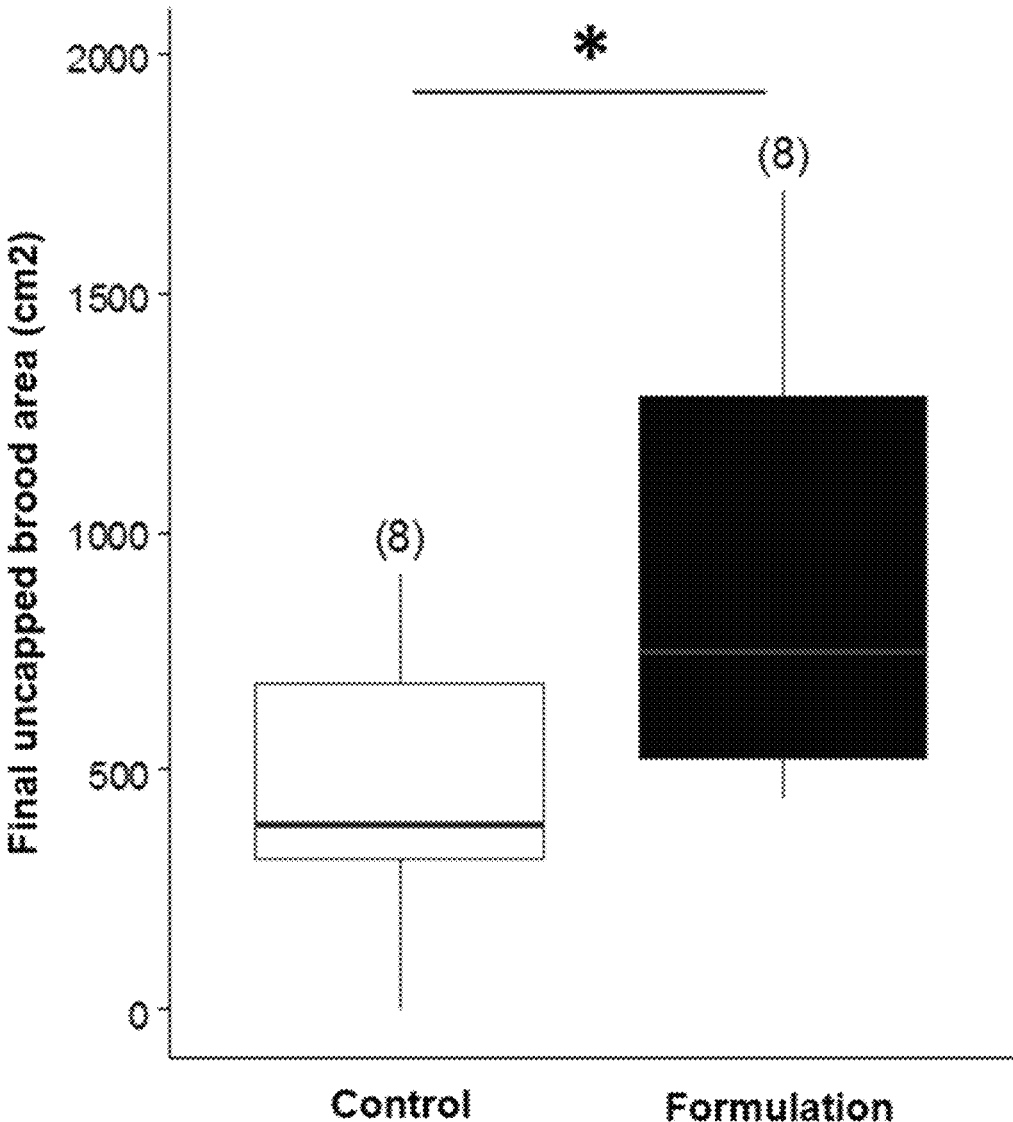
FIG. 6. Increase of beehive population. The growth of the brood area was calculated in two sets of hives: (i) Control Group, beehives previously fed by beekeepers with Sucrose Solution (white color); (ii) Treated Group, beehives fed with 500 ml of Sucrose Solution with the addition of Mixture VIII (black color). The total uncapped brood area of beehives was estimated by adding up the brood areas on both sides in all frames. Uncapped brood is an indicator that eggs were laid after the stimulation period. The number of beehives is stated between brackets. The data were collected from crops located near San Pedro (Province of Buenos Aires) in 2018. The asterisk means that significant differences exist between the treatments (p=0.03).

Increased bee activity in the treated beehives had a correlation with a greater pollen area (FIG. 5), and with higher increase in beehive population (FIG. 6), showing that the sugar composition with mixture VIII composition promotes greater food collection and stimulates beehive growth.

Beneficial effects on blueberry crops were also verified. Blueberry crops in proximity to the beehives treated with the sugar composition with mixture VIII had a higher yield when measured in terms of number of fruits per number of flowers (FIG. 7).

What is claimed is:

1. A composition that promotes targeted pollination by honeybees towards blueberry crops, wherein said composition comprises a sugar solution and a formulation diluted therein, wherein the formulation consists of between 35% and 45% v/v limonene, between 25% and 35% v/v cis-3-hexenyl acetate, and between 25% and 35% v/v cinnamyl alcohol.

2. The composition according to claim 1, wherein the formulation consists of 30% v/v cinnamyl alcohol, 30% v/v cis-3-hexenyl acetate, and 40% v/v limonene.

3. The composition according to claim 1, wherein the sugar solution is a 50% w/w solution of sucrose in water.

4. The composition according to claim 3, wherein said composition comprises between 0.1 and 0.2 ml of the formulation consisting of between 35% and 45% v/v limonene, between 25% and 35% v/v cis-3-hexenyl acetate, and between 25% and 35% v/v cinnamyl alcohol per liter of 50% w/w solution of sucrose in water.

5. The composition according to claim 4, wherein said composition comprises between 0.1 and 0.2 ml of the formulation consisting of 30% v/v cinnamyl alcohol, 30% v/v cis-3-hexenyl acetate, and 40% v/v limonene per liter of 50% w/w solution of sucrose in water.

6. A method for promoting targeted pollination by honeybees towards blueberry crops, wherein said method comprises the steps of:

a) administering the composition of claim 1 to beehives;

b) keeping the beehives within or in the immediate vicinity of the blueberry crop whose pollination is sought to be promoted until the end of the flowering period; and c) removing the beehives.

7. The method according to claim 6, wherein step a) is carried out via an artificial feeder placed into the beehives.

8. The method according to claim 6, wherein step a) is carried out within two days prior to moving the beehives to the crop whose pollination is sought to be promoted.

9. The method according to claim 6, wherein step a) is carried out after placing the beehives into the crop whose pollination is sought to be promoted.

10. The method according to claim 9, wherein step a) is carried out before a flowering level of the crop has reached 20%.

11. The method according to claim 6, wherein during step b) a second administration of the composition to the beehives is carried out.

* * * * *